US012709691B2

United States Patent
(12) United States Patent
Ando

(10) Patent No.: US 12,709,691 B2
(45) Date of Patent: Aug. 18, 2026

(54) INK JET INK COMPOSITION AND RECORDING METHOD

(71) Applicant: SEIKO EPSON CORPORATION, Tokyo (JP)

(72) Inventor: Keigo Ando, Matsumoto (JP)

(73) Assignee: SEIKO EPSON CORPORATION (JP)

(*) Notice: Subject to any disclaimer, the term of this patent is extended or adjusted under 35 U.S.C. 154(b) by 303 days.

(21) Appl. No.: 18/416,099

(22) Filed: Jan. 18, 2024

(65) Prior Publication Data

US 2024/0263030 A1 Aug. 8, 2024

(30) Foreign Application Priority Data

Jan. 19, 2023 (JP) ................................ 2023-006394

(51) Int. Cl.
*C09D 11/30* (2014.01)
*B41J 2/01* (2006.01)
(Continued)

(52) U.S. Cl.
CPC ................ *C09D 11/30* (2013.01); *B41J 2/01* (2013.01); *B41J 2/18* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553;
(Continued)

(56) References Cited

U.S. PATENT DOCUMENTS

| | | | |
|---|---|---|---|
| 2011/0175964 A1* | 7/2011 | Saito .................... | C09D 11/324 524/186 |
| 2018/0282564 A1* | 10/2018 | Matsuzaki ........... | C09D 11/322 |

(Continued)

FOREIGN PATENT DOCUMENTS

| | | |
|---|---|---|
| JP | 2021-024150 A | 2/2021 |
| JP | 2022-085548 A | 6/2022 |
| JP | 2022-116795 A | 8/2022 |

*Primary Examiner* — Manish S Shah

(74) *Attorney, Agent, or Firm* — Harness, Dickey & Pierce, P.L.C.

(57) ABSTRACT

An aqueous ink jet ink composition contains first resin particles formed from a resin other than a polyolefin-based resin and second resin particles formed from a polyolefin-based resin, the ink jet ink composition is used by a recording apparatus which has, at an inside of an ink supply path to supply an ink jet ink composition to an ink jet head, a portion in which members are pushed to each other by an external force, and as the second resin particles, resin particles having a specific surface area of 0.18 $m^2/g$ or less obtained from a relaxation time of a pulse NMR are contained.

10 Claims, 1 Drawing Sheet

(51) Int. Cl.

| | |
|---|---|
| ***B41J 2/18*** | (2006.01) |
| ***B41J 2/21*** | (2006.01) |
| ***C09D 11/102*** | (2014.01) |
| ***C09D 11/104*** | (2014.01) |
| ***C09D 11/107*** | (2014.01) |
| ***C09D 11/108*** | (2014.01) |
| ***C09D 11/322*** | (2014.01) |

(52) U.S. Cl.

CPC .......... *C09D 11/102* (2013.01); *C09D 11/104* (2013.01); *C09D 11/107* (2013.01); *C09D 11/108* (2013.01); *C09D 11/322* (2013.01)

(58) Field of Classification Search

CPC ...... B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2019/0292388 | A1* | 9/2019 | Ohashi | C09D 11/322 |
| 2021/0031552 | A1 | 2/2021 | Okuda et al. | |
| 2021/0162778 | A1* | 6/2021 | Asakawa | B41J 2/2107 |
| 2021/0252873 | A1* | 8/2021 | Ando | B41J 2/01 |
| 2021/0371687 | A1* | 12/2021 | Ishida | C09D 11/322 |
| 2022/0033672 | A1* | 2/2022 | Ishida | C09D 11/322 |
| 2022/0169873 | A1* | 6/2022 | Ishida | B41J 2/2107 |
| 2022/0186058 | A1* | 6/2022 | Uetake | B41J 2/2107 |
| 2022/0325119 | A1* | 10/2022 | Miyasa | C09D 11/322 |

* cited by examiner 1
8
3
2
5
6
M
4
7
11
SS 200
218
64
216
214
INK CARTRIDGE
P
202
204
212
108
320
210
106
220
100
222

INK JET INK COMPOSITION AND RECORDING METHOD

The present application is based on, and claims priority from JP Application Serial Number 2023-006394, filed Jan. 19, 2023, the disclosure of which is hereby incorporated by reference herein in its entirety.

BACKGROUND

1. Technical Field

The present disclosure relates to an ink jet ink composition and a recording method.

2. Related Art

In an aqueous ink such as a resin ink, since slippage is imparted to a recorded matter by using polyolefin resin particles (polyolefin wax), durability (such as abrasion resistance) of the recorded matter is made excellent. In particular, when acrylic-based or urethane-based resin particles functioning as a fixing resin and a polyolefin wax are used in combination, it has been known that the durability of a recorded matter is improved.

For example, JP-A-2022-085548 has disclosed a white ink composition containing a wax and an acrylic-based resin having a specific acid value. The above patent document has also disclosed that an image of the white ink composition as described above has excellent slippage and adhesion to a recording medium.

However, in the case in which an ink jet printer has a mechanism in an ink supply path to crush an ink by a mechanical stress, it has become clear that a polyolefin wax (hereinafter, referred to as "wax") is formed into foreign substances. When the foreign substances as described above are generated, a filter disposed in the supply path may be clogged in some cases. In addition, since the foreign substances are generated, ejection stability is decreased, and when a nozzle is dried during recording, ejection failure may unfortunately occur in some cases. Hence, while the abrasion resistance of a recorded matter is preferably maintained, an ink jet ink composition which is not likely to generate foreign substances due to the structure of a recording apparatus has been demanded.

SUMMARY

According to an aspect of the present disclosure, there is provided an aqueous ink jet ink composition containing first resin particles formed from a resin other than a polyolefin-based resin and second resin particles formed from a polyolefin-based resin. The ink jet ink composition described above is used by a recording apparatus which has, at an inside of an ink supply path to supply an ink jet ink composition to an ink jet head, a portion in which members are pushed to each other by an external force, and as the second resin particles, resin particles having a specific surface area of 0.18 $m^2/g$ or less obtained from a relaxation time of a pulse NMR are contained.

According to another aspect of the present disclosure, there is provided a recording method performed using a recording apparatus which has, at an inside of an ink supply path to supply an ink jet ink composition to an ink jet head, a portion in which members are pushed to each other by an external force, and the recording method comprises a supply step of supplying the ink jet ink composition according to the above aspect to the ink jet head through the ink supply path and an ejection step of ejecting the ink jet ink composition from the ink jet head.

DESCRIPTION OF EMBODIMENTS

Figure 1:
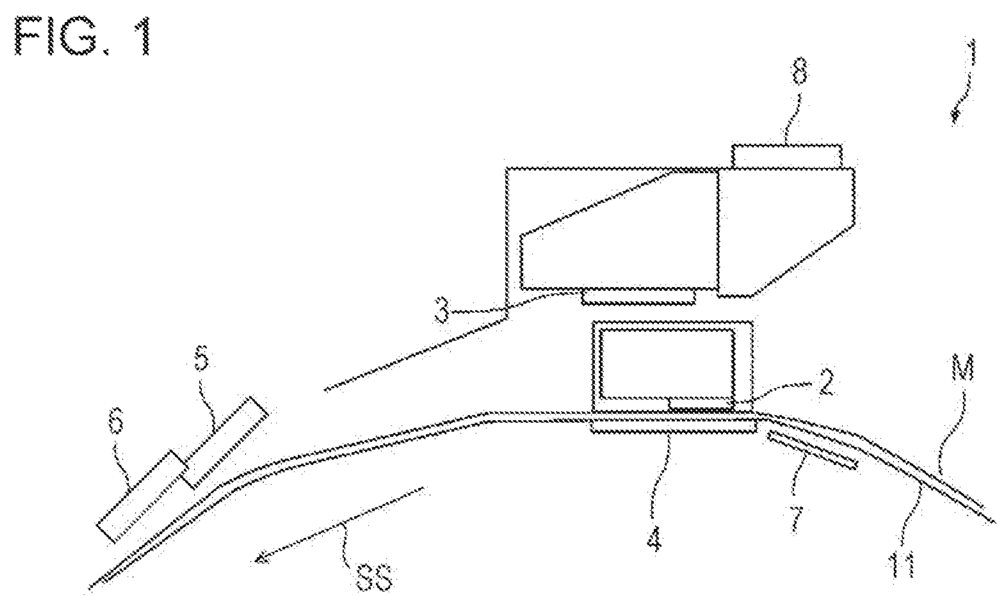
FIG. 1 is a schematic view showing one example of an ink jet recording apparatus.

Hereinafter, embodiments of the present disclosure will be described. The following embodiments are to explain examples of the present disclosure. The present disclosure is not limited at all to the following embodiments and also includes variously modified and/or changed embodiments to be performed without departing from the scope of the present disclosure. In addition, all components to be described below are not always required to be essential components of the present disclosure.

1. INK JET INK COMPOSITION

An ink jet ink composition according to this embodiment is an aqueous ink composition containing first resin particles formed from a resin other than a polyolefin-based resin and second resin particles formed from a polyolefin-based resin.

1.1. Application of Ink Jet Ink Composition

The ink jet ink composition according to this embodiment is used by a recording apparatus which has, at an inside of an ink supply path to supply an ink jet ink composition to an ink jet head, a portion in which members are pushed to each other by an external force.

As the ink supply path, for example, there may be mentioned a pipeline extending from an ink tank to a recording head or a circulation flow path to circulate an ink in a recording head or between a recording head and the outside thereof. In addition, the inside indicates an inner surface of a member forming the ink supply path with which an ink comes into contact. The portion in which members are pushed to each other by an external force is a portion in which parts of the inner surface of the ink supply path are brought into contact with each other. That is, the portion described above indicates a portion in which by a mechanical action from the outside, since at least one member is deformed, or at least two members are brought into contact with each other, the parts of the inner surface of the ink supply path are brought into contact with each other.

At the portion in which members are pushed to each other by an external force, an ink is crushed, and a stress to compress and/or aggregate at least part of an ink component is applied thereto. The stress as described above may generate aggregates in some cases from which the ink component is difficult to be re-dispersed only by the flow of the ink in the ink supply path. In this specification, the aggregates as described above are also called foreign substances in some cases.

As the recording apparatus which has, at an inside of an ink supply path to supply an ink jet ink composition to an ink jet head, a portion in which members are pushed to each other by an external force, for example, a recording apparatus having a diaphragm pump and/or a tube pump in an ink supply path may be mentioned. In the case of the diaphragm pump, when an ink supply amount is large, and/or an ink supply rate is high, the diaphragm may be pushed to the member in some cases, and in the case of the tube pump, when a tube thereof is squeezed, parts of the inner surface of the tube pump may be pushed to each other in some cases.

The operation principle of the tube pump is described, for example, in URL [https://www.welco-web.co.jp/company/_peristalticpump.html], and the operation principle of the diaphragm pump is described, for example, in [https://www.tacmina.co.jp/library/coretech/45/].

When the recording apparatus is a line printer or a head scan type printer in which an ink jet head scan width with respect to a recording medium can be set to 50 cm or more, the ink supply path tends to be long, and in order to transfer the ink through the ink supply path, a pressure pump is preferably provided. In particular, when the recording apparatus is a line printer, since an ink amount per unit time to be ejected from the ink jet head is large, a pressure pump is preferably used.

In the head scan type printer, the ink jet head scan width with respect to a recording medium is preferably 60 to 200 cm and more preferably 70 to 150 cm. In this case, although recording can be effectively performed on a recording medium having a long width, on the other hand, in particular, the ink supply path tends to be long. In addition, in a recording apparatus having an ink circulation mechanism, in order to circulate the ink by the circulation mechanism, a pressure pump is preferably provided.

As the pressure pump, a diaphragm pump and/or a tube pump is preferably provided in the ink supply path.

Accordingly, a sufficient pressure to transfer the ink can be obtained, the ink can be transferred to the ink supply path, and a large amount of the ink can be rapidly supplied to the ink jet head.

Since having a particularly high ability to supply the ink and an excellent durability, the diaphragm pump is preferable when the pressure to transfer the ink is required as described above. In particular, when the ink supply amount per unit time is large, a diaphragm of the diaphragm pump may be pushed to the member in many cases.

Although the tube pump has a relatively simple mechanism and is effective in terms of easy handling, when the tube is squeezed, parts of the inner surface thereof further tend to be pushed to each other.

According to the ink jet ink composition of this embodiment, even when the recording apparatus liable to generate foreign substances as described above is used, stable recording can be performed.

1.2. First Resin Particles

The ink jet ink composition according to this embodiment contains first resin particles. The first resin particles are formed from a resin other than a polyolefin-based resin.

The first resin particles is able to impart performance, such as adhesion and/or fixability, to an image formed by the ink jet ink composition adhered to a recording medium.

As the first resin particles, there may be mentioned resin particles formed, for example, from an urethane-based resin, an acrylic-based resin (including a styrene-acrylic-based resin), a fluorene-based resin, a rosin-modified resin, a terpene-based resin, a polyester-based resin, a polyamide-based resin, an epoxy-based resin, a vinyl chloride-based resin, a vinyl chloride-vinyl acetate copolymer, an ethylene-vinyl acetate-based resin, or a paraffin. Among those mentioned above, an urethane-based resin, an acrylic-based resin, or a polyester-based resin is preferable. Accordingly, the abrasion resistance of the image can be made more preferable. Although being handled in the form of an emulsion in many cases, those resin particles may also be handled in the form of a powder. In addition, only one type of resin particles may be used alone, or at least two types of resin particles may be used in combination.

The urethane-based resin is a generic name of resins each having an urethane bond. As the urethane-based resin, for example, there may be used a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond. In addition, as the urethane-based resin, a commercial product may also be used, and for example, a commercial product selected from Superflex 420, 460, 460s, 840, and E-4000 (trade name, manufactured by DKS Co., Ltd.); Resamine D-1060, D-2020, D-4080, D-4200, D-6300, and D-6455 (trade name, manufactured by Dainichiseika Color & Chemicals Mfg. Co., Ltd.); Takelac WS-6021 and W-512-A-6 (trade name, manufactured by Mitsui Chemicals & Polyurethanes, Inc.); Suncure 2710 (trade name, manufactured by LUBRIZOL); and Permarine UA-150 (trade name, manufactured by Sanyo Chemical Industries, Ltd.) may also be used.

The acrylic-based resin is a generic name of polymers each obtained by polymerizing at least one acrylic-based monomer, such as (meth)acrylic acid or a (meth)acrylic acid ester, as one component, and for example, a resin obtained from an acrylic-based monomer or a copolymer obtained by copolymerization between an acrylic-based monomer and another monomer may be mentioned. For example, an acrylic vinyl-based resin which is a copolymer between an acrylic-based monomer and a vinyl-based monomer may be mentioned. In addition, as the vinyl-based monomer, for example, styrene may be mentioned.

As the acrylic-based monomer, for example, acrylamide or acrylonitrile may also be used. As a resin emulsion formed using an acrylic-based resin as a raw material, a commercial product may also be used, and for example, a commercial product selected from FK-854 (trade name, manufactured by Chuorika Kougyo Co., Ltd.); Movinyl 952B and 718A (trade name, manufactured by Nippon Synthetic Chemical Industry Co., Ltd.); and Nipol LX852 and LX874 (trade name, manufactured by Zeon Corporation) may be used.

In addition, in this specification, the acrylic-based resin may also include a styrene-acrylic-based resin which will be described later. In addition, in this specification, (meth)acrylic indicates acrylic and/or methacrylic.

The styrene-acrylic-based resin is a copolymer obtained from a styrene monomer and a (meth)acrylic-based monomer, and for example, there may be mentioned a styrene-acrylic acid copolymer, a styrene-methacrylic acid copolymer, a styrene-methacrylic acid-acrylate copolymer, a styrene-$\alpha$-methylstyrene-acrylic acid copolymer, or a styrene-$\alpha$-methylstyrene-acrylic acid-acrylate copolymer. As the styrene-acrylic-based resin, a commercial product may also be used, and for example, Joncryl 62J, 7100, 390, 678, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); Movinyl 966A or 975N (trade name, manufactured by Nippon Synthetic Chemical Industry Co., Ltd.): or Vinyblan 2586 (manufactured by Nisshin Chemical Industry Co., Ltd.), may be used.

In this specification, the paraffin is an alkane having a molecular weight of several ten thousands or less and is discriminated from the polyolefin-based resin which will be described later. As an example of the paraffin, a wax may be mentioned, and as the wax, for example, a hydrocarbon wax, a paraffin wax, or a modified wax thereof may be mentioned.

In addition, the resin particles may be supplied in the form of an emulsion, and as an example of a commercial product of the resin emulsion as described above, for example, the commercial product may be used after selected from Microgel E-1002 and E-5002 (trade name, styrene-acrylic-based resin emulsion, manufactured by Nippon Paint Co., Ltd.); Voncoat 4001 (trade name, acrylic-based resin emulsion, manufactured by DIC Corporation); Voncoat 5454 (trade name, styrene-acrylic-based resin emulsion, manufactured by DIC Corporation); Polysol AM-710, AM-920, AM-2300, AP-4735, AT-860, and PSASE-4210E (acrylic-based resin emulsion), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene-vinyl acetate resin emulsion), and Polysol PSASE-6010 (ethylene/vinyl acetate resin emulsion) (trade name, manufactured by Showa Denko K.K.); Polysol SAE1014 (trade name, styrene-acrylic-based resin emulsion, manufactured by Zeon Corporation); Saivinol SK-200 (trade name, acrylic-based resin emulsion, manufactured by Saiden Chemical Industry Co., Ltd.); AE-120A (trade name, acrylic resin emulsion, manufactured by JSR Corporation); AE373D (trade name, carboxy-modified styrene-acrylic resin emulsion, manufactured by Emulsion Technology Co., Ltd.); Seikadyne 1900W (trade name, ethylene-vinyl acetate resin emulsion, manufactured by Dainichiseika Color & Chemicals Mfg. Co., Ltd.); Vinyblan 2682 (acrylic resin emulsion), Vinyblan 2886 (vinyl acetate-acrylic resin emulsion), and Vinyblan 5202 (acetic acid-acrylic resin emulsion) (trade name, manufactured by Nisshin Chemical Industry Co., Ltd.); Elitel KA-3556, KA-5071S, KT-8803, KT-9204, KT-8701, KT-8904, and KT-0507 (trade name, polyester resin emulsion, manufactured by Unitika Ltd.); Hitec SN-2002 (trade name, polyester resin emulsion, manufactured by Toho Chemical Industry Co., Ltd.); Takelac W-6020, W-635, w-6061, W-605, and W-6021 (trade name, urethane-based resin emulsion, manufactured by Mitsui Chemicals Polyurethane); Superflex 420, 870, 800, 150, 420, 460, 470, 610, and 700 (trade name, urethane-based resin emulsion, manufactured by DKS Co., Ltd.): Permarine UA-150 (trade name, urethane-based resin emulsion, manufactured by Sanyo Chemical Industries, Ltd.); Suncure 2710 (trade name, urethane-based resin, manufactured by Lubrizol Japan Ltd.); NeoRez R-9660, R-9637, and R-940 (trade name, urethane-based resin emulsion, manufactured by Kusumoto Chemicals, Ltd.); Adekabontighter HUX-380 and 290K (trade name, urethane-based resin emulsion, manufactured by ADEKA Corporation); Movinyl 966A and Movinyl 7320 (trade name, manufactured by Nippon Synthetic Chemical Industry Co., Ltd.); Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade name, manufactured by BASF); NK Binder R-5HN (trade name, manufactured by Shin-Nakamura Chemical Co., Ltd.); and Hydran WLS-210 (trade name, non-crosslinked polyurethane, manufactured by DIC Corporation).

A volume average particle diameter of the first resin particles is preferably 10 to 300 nm, more preferably 30 to 300 nm, further preferably 30 to 250 nm, and particularly preferably 40 to 220 nm. The volume average particle diameter (D50) may be measured by a particle size distribution measurement device. As the particle size distribution measurement device, for example, a particle size distribution meter (such as "Nanotrac Series", manufactured by MicrotracBEL) using a dynamic light scattering method as a measurement principle may be mentioned. The volume average particle diameter is represented by the D50 value A glass transition temperature of the first resin particles is preferably 10° C. to 130° C., more preferably 30° C. to 100° C., further preferably 40° C. to 80° C., and particularly preferably 50° C. to 75° C. In the case described above, for example, the reliability and the abrasion resistance can be preferably made more excellent.

A content of the first resin particles in the ink jet ink composition with respect to a total mass thereof is as a solid content, 0.1 to 20 percent by mass, preferably 1 to 15 percent by mass, and more preferably 2 to 10 percent by mass.

1.3. Second Resin Particles

The ink jet ink composition according to this embodiment contains second resin particles. The second resin particles are formed from a polyolefin-based resin.

The polyolefin-based resin is a resin having a structure skeleton of an olefin, such as ethylene, propylene, or butylene, and a known polyolefin-based resin may be appropriately selected and used. As the polyolefin-based resin, a commercial product may also be used, and for example, there may be used Arrowbase CB-1200 or CD-1200 (trade name, manufactured by Unitika Ltd.), HORDAMER PE02, PE03, PE34, or PE35 (trade name, manufactured by BYK Japan KK), AQUACER 552 or 593 (trade name, manufactured by BYK Japan KK), or Hitec E Series (manufactured by Toho Chemical Industry Co., Ltd.). In addition, the polyolefin-based resin may be a modified resin. In addition, AQUACER 539 (trade name, manufactured by BYK Japan KK) has a small molecular weight and is classified in the paraffin-based resin in this specification.

The ink jet ink composition contains second resin particles having a specific surface area of 0.18 $m^2/g$ or less which is obtained from a relaxation time of a pulse NMR. The specific surface area obtained from a relaxation time of a pulse NMR is acquired by the following measurement and by calculation based on the following equations (I) and (II).

apparatus: pulse NMR (Acorn Drop, manufactured by Xigo nanotools)
measurement temperature: 30° C.
measurement sample: 0.5 mL
measurement sample A1: second resin particle dispersion
measurement sample A2: water
$S_p$: specific surface area of second resin particles in ink jet ink composition [$m^2/g$]

$$S_p=\{[(R_{av}/R_b)-1]\times R_b\}/(0.0016\times\Psi_p) \quad \text{Equation (I)}$$

In Equation (I), $R_{av}$ represents the inverse number of a measurement value of the pulse NMR obtained using the measurement sample A1, $R_b$ represents the inverse number of a measurement value of the pulse NMR obtained using the measurement sample A2, and $\Psi_p$ is obtained by calculation using the following equation.

$$\Psi_p=(S_c/S_d)/[(1-S_c)/T_d] \quad \text{Equation (II)}$$

In Equation (II), $S_c$ represents a solid content concentration (percent by mass) of the measurement sample A1, $S_d$ represents the density of the second resin particles of the measurement sample A1, and $T_d$ represents the density of the measurement sample A2.

In addition, Sa (density of the second resin particles) is regarded as 1.0, and $T_d$ (density of water) is also regarded as 1.0.

Since the specific surface area of the second resin particles is 0.18 $m^2/g$ or less, a rate of a hydrophilic surface of the second resin particle is decreased, and even if the second resin particles are aggregated when being crushed, the second resin particles are likely to be released from the aggregation and are also likely to be re-dispersed. As a result, the generation of foreign substances can be suppressed.

The specific surface area of the second resin particles is preferably 0.01 to 0.18 $m^2/g$, more preferably 0.05 to 0.18 $m^2/g$, further preferably 0.10 to 0.18 $m^2/g$, and particularly preferably 0.15 to 0.18 $m^2/g$.

In the case in which the specific surface area is in the range as described above, resistance against aggregation when the second resin particles are crushed and dispersion stability thereof in the ink jet ink composition can both be made more preferable. In addition, the abrasion resistance of the image can be further improved.

Although a content of the second resin particles is not particularly limited, the content described above with respect to the total mass of the ink jet ink composition is preferably 0.05 to 10.0 percent by mass, more preferably 0.1 to 5.0 percent by mass, further preferably 0.5 to 3.0 percent by mass, and particularly preferably 0.5 to 2.0 percent by mass. When the content of the second resin particles is in the range described above, the abrasion resistance of the image can be further improved.

In addition, although the volume average particle diameter of the second resin particles is not particularly limited, the volume average particle diameter described above is preferably 10 to 500 nm, more preferably 50 to 300 nm, and further preferably 50 to 200 nm. When the volume average particle diameter of the second resin particles is in the range as described above, even in the state in which foreign substances are more liable to be generated, stable recording can be performed.

In addition, although the ink jet ink composition may also contain a polyolefin-based resin particles having a specific surface area of more than 0.18 $m^2/g$, in the case as described above, a content of the resin particles described above with respect to the total mass of the ink jet ink composition is preferably 0.05 percent by mass or less, more preferably 0.02 percent by mass or less, and further preferably 0 percent by mass.

In addition, a mass rate of the polyolefin-based resin particles having a specific surface area of 0.18 $m^2/g$ or less to a total mass of the polyolefin-based resin particles contained in the ink jet ink composition is preferably 90 percent by mass or more.

1.4. Mass Ratio in Content of First Resin Particles to Second Resin Particles

A mass ratio "a/b" (which is obtained when the content of the first resin particles and the content of the second resin particles in the ink jet ink composition are represented by a and b, respectively) of the content of the first resin particles to the content of the second resin particles is preferably 0.5 to 10, more preferably 0.8 to 8, and further preferably 1 to 5.

When the mass ratio in content of the first resin particles to the second resin particles is in the range described above, the abrasion resistance of an image to be obtained can be further improved.

1.5. Water

The ink jet ink composition according to this embodiment is an aqueous ink. An aqueous composition indicates a composition containing water as one of main solvent components. Accordingly, while environmental load is reduced, for example, recording with low odor can be performed.

The water is contained as a main solvent component of the ink jet ink composition and is a component to be evaporated and scattered. As the water, pure water, such as ion exchange water, ultrafiltration water, reverse osmosis water, or distilled water, or ultrapure water in which ionic impurities are removed as much as possible is preferable. In addition, when water sterilized, for example, by UV radiation or addition of hydrogen peroxide is used, in the case in which the ink jet ink composition is stored for a long time, generation of fungi and/or bacteria can be preferably suppressed.

A content of the water with respect to the total mass of the ink jet ink composition is preferably 45 percent by mass or more, more preferably 50 to 98 percent by mass, even more preferably 55 to 95 percent by mass, further preferably 65 to 90 percent by mass, and particularly preferably 70 to 85 percent by mass. When the content of the water is in the range described above, a drying property of the ink is made excellent, and an image of a recorded matter can be preferably suppressed from being stained by rubbing.

1.6. Other Components

The ink jet ink composition may also contain the following components.

1.6.1. Organic Solvent

The ink jet ink composition may contain at least one solvent (organic solvent). As the solvent, for example, an ester, an alkylene glycol ether, a cyclic ester, a nitrogen-containing solvent, an alcohol, or a polyvalent alcohol may be mentioned. As the nitrogen-containing solvent, for example, a cyclic amide or an acyclic amide may be mentioned. As the acyclic amide, for example, an alkoxyalkylamide may be mentioned.

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, or dipropylene glycol acetate propionate.

As the alkylene glycol ether, a monoether or a diether of an alkylene glycol may be used, and an alkyl ether is preferable. As a concrete example, for example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

In addition, among the above alkylene glycols, compared to a monoether, a diether is more likely to dissolve or swell the first resin particles in the ink jet ink composition, and the abrasion resistance of the image is preferably further improved.

As the cyclic ester, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, or ε-decanolactone or a compound in which a hydrogen atom of a methylene group adjacent to the carbonyl group of one of the cyclic esters mentioned above is replaced by an alkyl group having 1 to 4 carbon atoms.

As the alkoxyalkylamide, for example, there may be mentioned 3-methoxy-N, N-dimethylpropionamide, 3-methoxy-N, N-diethylpropionamide, 3-methoxy-N, N-methylethylpropionamide, 3-ethoxy-N, N-dimethylpropionamide, 3-ethoxy-N, N-diethylpropionamide, 3-ethoxy-N, N-methylethylpropionamide, 3-n-buthoxy-N, N-dimethylpropionamide, 3-n-buthoxy-N, N-diethylpropionamide, 3-n-buthoxy-N, N-methylethylpropionamide, 3-n-propoxy-N, N-dimethylpropionamide, 3-n-propoxy-N, N-diethylpropionamide, 3-n-propoxy-N, N-methylethylpropionamide, 3-iso-propoxy-N, N-dimethylpropionamide, 3-iso-propoxy-N, N-diethylpropionamide, 3-iso-propoxy-N, N-methylethylpropionamide, 3-tert-butoxy-N, N-dimethylpropionamide, 3-tert-butoxy-N, N-diethylpropionamide, or 3-tert-butoxy-N, N-methylethylpropionamide.

As the cyclic amide, a lactam may be mentioned, and for example, a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone, may be mentioned. Those mentioned above are each preferable since film formation of the resin is promoted, and in particular, 2-pyrrolidone is more preferable.

As the alcohol, for example, a compound in which one hydrogen atom of an alkane is replaced by a hydroxy group may be mentioned. As the alkane, an alkane having 10 carbon atoms or less is preferable, an alkane having 6 carbon atoms or less is more preferable, and an alkane having 3 carbon atoms or less is further preferable. The number of carbon atoms of the alkane is one or more and is preferably two or more. The alkane may have either a linear structure or a branched structure. As the alcohol, for example, there may be mentioned methanol, ethanol, n-propyl alcohol, iso-propyl alcohol, n-butanol, 2-butanol, tert-butanol, iso-butanol, n-pentanol, 2-pentanol, 3-pentanol, tert-pentanol, phenoxyethanol, benzyl alcohol, or phenoxypropanol.

The polyvalent alcohol is a compound having at least two hydroxy groups in its molecule. As the polyvalent alcohol, for example, an alkanediol or a polyol may be mentioned.

As the alkanediol, for example, a compound in which two hydrogen atoms of an alkane are replaced by two hydroxy groups may be mentioned. As the alkanediol, for example, there may be mentioned ethylene glycol (alias: ethane-1,2-diol), propylene glycol (alias: propane-1,2-diol), 1,2-butanediol, 1,2-pentanediol, 1,2-hexanediol, 1,2-octanediol, 1,3-propanediol, 1,3-butylene glycol (alias: 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, or 2-methyl-2-propyl-1,3-propanediol.

As the polyol, for example, a condensate in which at least two alkanediol molecules are intermolecular condensed between hydroxy groups or a compound having at least three hydroxy groups may be mentioned.

As the condensate in which at least two alkanediol molecules are intermolecular condensed between hydroxy groups, for example, a dialkylene glycol, such as diethylene glycol or dipropylene glycol, or a trialkylene glycol, such as triethylene glycol or tripropylene glycol, may be mentioned.

The compound having at least three hydroxy groups is a compound which has a skeleton formed from an alkane or a polyether structure and also has at least three hydroxy groups. As the compound having at least three hydroxy groups, for example, there may be mentioned glycerin, trimethylolethane, trimethylolpropane, 1,2,5-hexanetriol, 1,2,6-hexanetriol, pentaerythritol, or a polyoxypropylenetriol.

The organic solvents mentioned above may be used alone, or at least two types thereof may be used in combination.

A content of the organic solvent with respect to the total mass of the ink jet ink composition is in total preferably 1 percent by mass or more, more preferably 5 percent by mass or more, even more preferably 10 percent by mass or more, further preferably 20 percent by mass or more, and particularly preferably 30 percent by mass or more. An upper limit of the content of the organic solvent is preferably 60 percent by mass or less, more preferably 50 percent by mass or less, and further preferably 40 percent by mass or less. In addition, the content of the organic solvent with respect to a total mass of the solvent components contained in the ink jet ink composition is also preferably set to the range described above.

In addition, when the organic solvent is contained, a rate of an organic solvent having a standard boiling point of 190° C. or less with respect to the total mass of the organic solvent is preferably 50 percent by mass or more, more preferably 60 percent by mass or more, and further preferably 70 percent by mass or more. The upper limit described above is 100 percent by mass.

Accordingly, even when the ink jet ink composition is liable to be dried in the vicinity of a nozzle of the recording head, and the ejection reliability is liable to be decreased, stable recording can be performed, and the abrasion resistance of an image to be obtained can also be made further excellent.

In addition, when the organic solvent is contained, the highest standard boiling point of the organic solvent is more preferably 250° C. or less, and an organic solvent having a standard boiling point of more than 280° C. is preferably not contained. Accordingly, even when the ink jet ink composition is liable to be dried in the vicinity of the nozzle of the recording head, and the ejection reliability is liable to be decreased, stable recording can be performed, and the abrasion resistance of an image to be obtained can also be made further excellent.

1.6.2. pH Adjuster

The ink jet ink composition may also contain a pH adjuster. As the pH adjuster, for example, there may be mentioned an amine, such as diethanolamine, triethanolamine, propanolamine, or morpholine, or its modified material; an organic acid, such as acetic acid, citric acid, phthalic acid, oxalic acid, succinic acid, adipic acid, or an amino acid; an inorganic salt, such as sodium hydroxide or potassium hydroxide; ammonium hydroxide, or a quaternary ammonium hydroxide (tetramethyl ammonium). In addition, among those mentioned above, the amines mentioned above are not to be included in the organic solvent described above.

1.6.3. Surfactant

The ink jet ink composition may also contain a surfactant. The surfactant has a function to adjust a surface tension of the ink jet ink composition, and hence, for example, the wettability thereof to a recording medium may be adjusted. Among the surfactants, for example, an acetylene glycol-based surfactant, a silicone-based surfactant, or a fluorine-based surfactant may be preferably used.

Although the acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products and Chemicals Inc.); Olfine B, Y, P, A, STG, SPC, E1004, E1010, PD-001, PD-002W, PD-003, PD-004, EXP.4001, EXP.4036, EXP. 4051, AF-103, AF-104, AK-02, SK-14, or AE-3 (trade name, manufactured by Nisshin Chemical Industry Co., Ltd.); or Acetylenol E00, E00P, E40, or E100 (trade name, manufactured by Kawaken Fine Chemicals Co., Ltd.).

Although the silicone-based surfactant is not particularly limited, a polysiloxane-based compound is preferably mentioned. Although the polysiloxane-based compound is not particularly limited, for example, a polyether-modified organosiloxane may be mentioned. As a commercial product of the polyether-modified organosiloxane, for example, there may be mentioned BYK-306, BYK-307, BYK-333, BYK-341, BYK-345, BYK-346, or BYK-348 (trade name, manufactured by BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.); or Silface SAG002, 005, 503A, or 008 (trade name, manufactured by Nisshin Chemical Industry Co., Ltd.).

As the fluorine-based surfactant, a fluorine modified polymer is preferably used, and as a concrete example, for example, BYK-3440 (manufactured by BYK Japan KK); Surflon S-241, S-242, or S-243 (trade name, manufactured by AGC Seimi Chemical Co., Ltd.); or Ftergent 215 M (manufactured by Neos Co., Ltd.) may be mentioned.

When the surfactant is contained in the ink jet ink composition, at least two types of surfactants may be contained. A content of the surfactant contained in the ink jet ink composition with respect to the total mass thereof is 0.1 to 2 percent by mass, preferably 0.4 to 1.5 percent by mass, and more preferably 0.5 to 1.0 percent by mass.

1.6.4. Colorant

The ink jet ink composition according to this embodiment may also contain a colorant. As the colorant, both a pigment and a dye may be used, and for example, an inorganic pigment, such as carbon black or titanium white, an organic pigment, an oil soluble dye, an acidic dye, a direct dye, a reactive dye, a basic dye, a disperse dye, a sublimation dye, or the like may be used. The ink jet ink composition preferably contains a pigment, and the pigment may be dispersed by a dispersion resin.

Pigment

As the inorganic pigment, a carbon black (C.I. Pigment Black 7), such as a furnace black, a lamp black, an acetylene black, or a channel black, an iron oxide, a titanium oxide, a zinc oxide, or a silica may be used.

As the organic pigment, for example, there may be mentioned a quinacridone-based pigment, a quinacridonequinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, or an azo-based pigment.

As a concrete example of the organic pigment, the following pigments may be mentioned.

As a cyan pigment, for example, there may be mentioned C.I. Pigment Blue 1, 2, 3, 15:3, 15:4, 15:34, 16, 22, or 60; or C.I. Vat Blue 4 or 60, and one selected from the group consisting of C.I. Pigment Blue 15:3, 15:4, and 60 or a mixture of at least two thereof may be mentioned by way of example.

As a magenta pigment, for example, there may be mentioned C.I. pigment Red 5,7,12,48 (Ca), 48 (Mn), 57 (Ca), 57:1, 112, 122, 123, 168, 184, 202, or 209; or C.I. pigment Violet 19, and one selected from the group consisting of C.I. Pigment Red 122, 202, and 209 and C.I. pigment Violet 19 or a mixture of at least two thereof may be mentioned by way of example.

As a yellow pigment, for example, there may be mentioned C.I. pigment Yellow 1, 2, 3, 12, 13, 14C, 16, 17, 73, 74, 75, 83, 93, 95, 97, 98, 109, 110, 114, 128, 129, 138, 150, 151, 154, 155, 180, or 185, and one selected from the group consisting of C.I. Pigment Yellow 74, 109, 110, 128, 138, 150, and 180 or a mixture of at least two thereof may be mentioned by way of example.

Colorants other than those mentioned above may also be used. For example, an orange pigment and a green pigment may also be mentioned.

The pigments mentioned above are preferable examples, and pigments to be used are not limited thereto. Those pigments may be used alone or in combination as a mixture and may also be used in combination with a dye.

In addition, the pigment may be used after being dispersed by a dispersant selected from a water soluble resin, a surfactant, and the like or may be used after being dispersed as a self-dispersible pigment which is formed by oxidation or sulfonation of a pigment surface thereof using ozone, hypochlorous acid, fuming sulfuric acid, or the like. In addition, as the surfactant used as the dispersant, the surfactant which may be contained in the ink composition described above may also be used.

Dye

The ink jet ink composition according to this embodiment may also use a dye as the colorant. The dye is not particularly limited, and an acidic dye, a direct dye, a reactive dye, a basic dye, or a disperse dye may be used. As the dye, for example, there may be mentioned C.I. Acid Yellow 17, 23, 42, 44, 79, 142; C.I. Acid Red 52, 80, 82, 249, 254, or 289; C.I. Acid Blue 9, 45, or 249; C.I. Acid Black 1, 2, 24, or 94; C.I. Food Black 1 or 2; C.I. Direct Yellow 1, 12, 24, 33, 50, 55, 58, 86, 132, 142, 144, or 173; C.I. Direct Red 1, 4, 9, 80, 81, 132, 225, or 227; C.I. Direct Blue 1, 2, 15, 71, 86, 87, 98, 165, 199, or 202; C.I. Direct Black 19, 38, 51, 71, 154, 168, 171, or 195; C.I. Reactive Red 14, 32, 55, 79, 141, or 249; or C.I. Reactive Black 3, 4, or 35.

Although a content of the colorant may be appropriately adjusted in accordance with the application, the content described above with respect to the total mass of the ink jet ink composition is preferably 0.1 to 17.0 percent by mass, more preferably 0.2 to 15.0 percent by mass, further preferably 1.0 to 10.0 percent by mass, and particularly preferably 2.0 to 5.0 percent by mass.

1.6.5. Others

The ink jet ink composition according to this embodiment may also contain, if needed, an antiseptic/fungicide agent, an antirust agent, a chelating agent, a viscosity adjuster, a solubilizing agent, an antioxidant, and the like.

Antiseptic/Fungicide Agent

As the antiseptic/fungicide agent, for example, there may be mentioned sodium benzoate, sodium pentachlorophenol, sodium 2-pyridine-thiol-1-oxide, sodium sorbate, sodium dehydroacetate, 1,2-dibenzine thiazolin-3-on (Proxel CRL, Proxel BND, Proxel GXL, Proxel XL-2, or Proxel TN, manufactured by ICI).

Chelating Agent

The chelating agent has a function to trap ions. As a chelating agent as described above, for example, there may be mentioned an ethylenediaminetetraacetate salt (EDTA), a nitrilotriacetate salt of ethylene diamine, a hexametaphosphate salt, a pyrophosphate salt, or a metaphosphate salt.

1.7. Manufacturing Method

The ink jet ink composition according to this embodiment can be obtained in a manner such that the components described above are mixed together in an arbitrary order, and if needed, impurities are then removed by filtration or the like. As a mixing method of the components, a method in which the components are sequentially added in a container equipped with a stirring device, such as a mechanical stirrer or a magnetic stirrer, and are then stirred and mixed is preferably used. As a filtration method, if needed, centrifugal filtration or filter filtration may be performed.

1.8. Physical Properties of Ink Jet Ink Composition

According to the ink jet ink composition of this embodiment, a surface tension at 25° C. is preferably 10 to 40 mN/m and more preferably 25 to 40 mN/m. The measurement of the surface tension may be performed such that for example, using an automatic surface tensiometer CBVP-Z (trade name, manufactured by Kyowa Interface Science Co., Ltd.), a surface tension at which a platinum plate is wetted with a treatment liquid composition in an environment at 25° C. is confirmed.

According to the ink jet ink composition of this embodiment, a viscosity at 20° C. is preferably 2 to 15 mPa·s, more preferably 2 to 5 mPa·s, and further preferably 2 to 3.6 mPa·s. The measurement of the viscosity may be performed such that for example, using a viscoelastic tester MCR-300 (trade name, manufactured by Pysica), a viscosity in an environment at 40° C. or 20° C. is measured.

1.9. Operation Effect

According to the ink jet ink composition of this embodiment, even when a recording apparatus having a portion in which members are pushed to each other by an external force is used, the generation of foreign substances is suppressed, and stable recording can be performed. In addition, according to this ink jet ink composition, the abrasion resistance of an image to be formed can also be made preferable.

2. RECORDING METHOD

A recording method according to this embodiment is performed using a recording apparatus having, at an inside of an ink supply path to supply an ink jet ink composition to an ink jet head, a portion in which members are pushed to each other by an external force, and the method described above includes a supply step of supplying the ink jet ink composition described above to the ink jet head through the ink supply path and an ejection step of ejecting the ink jet ink composition from the ink jet head.

2.1. Ink Jet Recording Apparatus

One example of an ink jet recording apparatus which can be used for the recording method according to this embodiment will be described with reference to the drawings.

FIG. 1 is a schematic cross-sectional view showing an ink jet recording apparatus. As shown in FIG. 1, an ink jet recording apparatus 1 includes an ink jet head 2, an IR heater 3, a platen heater 4, a heating heater 5, a cooling fan 6, a pre-heater 7, and a ventilation fan 8.

The ink jet head 2 is configured such that an ink jet ink composition is ejected from a nozzle of the ink jet head 2 and is adhered to a recording medium M for recording. In this embodiment, the ink jet head 2 is a serial type ink jet head and is scanned at least two times in a main scanning direction relatively with respect to the recording medium M so that the ink is adhered to the recording medium M. The ink jet head 2 is scanned at least two times in the main scanning direction (in a depth direction to the plane in FIG. 1) relatively with respect to the recording medium M. A medium width direction indicates the main scanning direction of the ink jet head 2. The scan in the main scanning direction is also called a main scan.

In addition, the main scanning direction indicates a direction in which a carriage (not shown) mounting the ink jet head 2 is transferred. In FIG. 1, the main scanning direction is a direction intersecting a sub-scanning direction which is a transport direction of the recording medium M shown by an arrow SS. In addition, when the main scan of the ink jet head 2 and the sub-scan to transport the recording medium M are repeatedly performed at least two times, the recording is performed on the recording medium M. That is, the ejection step is performed by at least two main scans to transfer the ink jet head 2 in the main scanning direction and at least two sub-scans to transport the recording medium M in the sub-scanning direction intersecting the main scanning direction.

To the ink jet head 2, the ink jet ink composition is supplied from an ink tank not shown through the ink supply path. The ink tank and the ink jet head 2 are connected to the ink supply path formed of a tube or the like. In addition, in the ink supply path described above, a tube pump is provided. Different types of ink jet ink compositions are filled in respective ink tanks, and the ink jet ink compositions are supplied to the respective nozzles from the ink tanks.

For the ejection from the ink jet head 2, a related known method may be used. In this embodiment, a method in which a liquid droplet is ejected using the vibration of a piezoelectric element, that is, an ejection method in which an ink droplet is formed by mechanical deformation of an electrostrictive element, is used.

In the ink jet recording apparatus 1, in order to dry the ink jet ink composition ejected from the ink jet head 2 and adhered to the recording medium M, the ventilation fan 8, the IR heater 3, and the platen heater 4 are provided. When the ventilation fan 8, the IR heater 3, and the platen heater 4 are appropriately used in combination, a primary drying step can be performed. In the primary drying step, the recording medium M is not always required to be heated, and the ventilation fan 8 may only be used for ordinary temperature ventilation.

In addition, when the IR heater 3 is used, the recording medium M can be heated by radiation of infrared rays from an ink jet head 2 side. Accordingly, although the ink jet head 2 is also liable to be simultaneously heated, compared to the case in which a rear surface of the recording medium M is heated by the platen heater 4 and the like, the temperature can be increased without receiving the influence of the thickness of the recording medium M. In addition, various types of fans (such as the ventilation fan 8) to dry the ink on the recording medium M by applying a hot wind or a wind having the same temperature as that in the environment to the recording medium M may also be provided.

In order to rapidly dry a treatment liquid and the ink jet ink composition ejected from the ink jet head 2 and adhered to the recording medium M, the platen heater 4 can heat the recording medium M at a position facing the ink jet head 2 with a platen 11 interposed therebetween. The platen heater 4 can conductively heat the recording medium M, and in the recording method of this embodiment, the ink jet ink composition can be adhered to the recording medium M which is heated by the platen heater 4. Hence, the ink jet ink composition can be rapidly fixed onto the recording medium M, and an image quality can be improved.

The heating heater 5 is a heater to dry and fix the treatment liquid and the ink jet ink composition adhered to the recording medium M. That is, the heating heater 5 is a secondary heating heater or a secondary drying heater. The heating heater 5 can be used in a post-drying step. Since the heating heater 5 heats the recording medium M on which an image is recorded, moisture and the like contained in the ink jet ink composition are more rapidly evaporated and scattered, and an ink film is formed from the resin contained in the ink jet ink composition. As described above, since the ink film is tightly fixed or adhered to the recording medium M, a film forming property can be made excellent, and an image having an excellent image quality can be obtained in a short time.

The ink jet recording apparatus 1 may also include the cooling fan 6. After the ink jet ink composition recorded on the recording medium M is dried, since the ink jet ink composition on the recording medium M is cooled by the cooling fan 6, the ink film can be formed on the recording medium M with good adhesion.

In addition, the ink jet recording apparatus 1 may also include the pre-heater 7 to heat the recording medium M in advance before the ink jet ink composition is adhered thereto. Furthermore, in order to more efficiently dry the ink jet ink composition adhered to the recording medium M, the ink jet recording apparatus 1 may also include the ventilation fan 8.

In FIG. 1, although the serial type ink jet recording apparatus is shown, a line type ink jet recording apparatus and a head scan type printer which is a so-called lateral printer may also be used. In addition, in the case of the serial type, a scan width (scan distance in the main scanning direction) of the ink jet head 2 may be 50 cm or more. In addition, the pump provided in the ink supply path may be a diaphragm pump. Furthermore, an ink circulation mechanism having a circulation path may be provided in the ink jet head 2 or between the ink jet head 2 and the outside thereof. In this case, the circulation path may also be regarded as the ink supply path.

Figure 2:
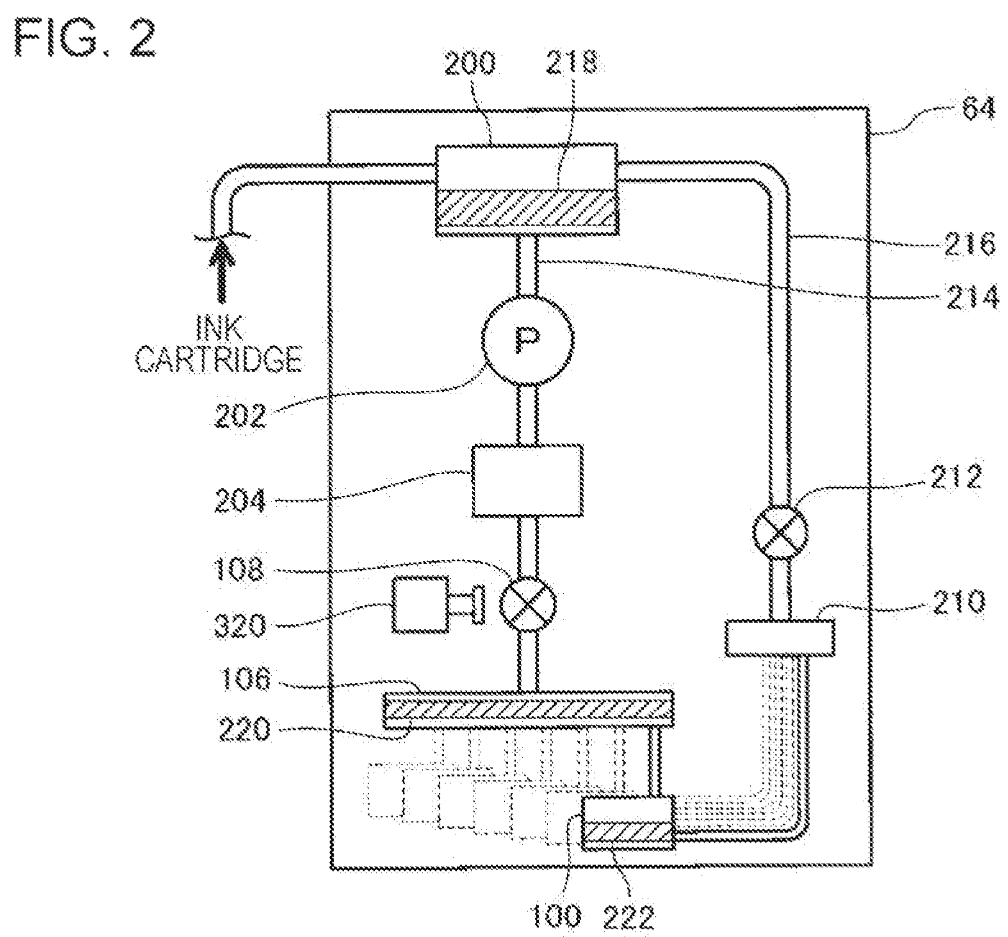
FIG. 2 is a schematic view showing one example of an ink supply path of the ink jet recording apparatus.

FIG. 2 is a schematic view showing one example of a periphery 64 of the ink supply path of the ink jet recording apparatus of this embodiment. A subtank 200 receives a supply of the ink from an ink cartridge (not shown) and supplies the ink to a plurality of ink jet heads 100 by a pressure pump 202 through a filter module 204 and a common reservoir unit 106 in this order. In the subtank 200, an ink liquid level 218 is generated. As the pressure pump 202, a diaphragm pump or a tube pump may be used.

The ink jet head 100 is a head to eject the ink to a recording medium (not shown). A pressure regulation valve 108 is opened by a valve open actuator 320, so that the supply of the ink from the subtank 200 to the ink jet heads 100 is controlled.

When the pressure regulation valve 108 is opened, the ink passing through the filter module 204 flows in a common reservoir 220 in the common reservoir unit 106. The ink supply path is branched into a plurality of paths from the common reservoir 220 and is connected to the ink jet heads 100.

The ink not ejected from the ink jet head 100 flows through an ink reservoir 222 in the ink jet head and is circulated to the subtank 200 through an integrated fitting 210 and a return path 216 when an opening/closing valve 212 is opened. Since the ink is circulated between the subtank 200 and the ink jet heads 100, even when the ink component is separated and/or precipitated during a long stay of the ink, the ink can be recovered from the problems as described above. The ink circulated to the subtank 200 is mixed with a new ink supplied from the ink cartridge and is then again supplied to the ink jet head 100 through an outward path 214. However, the ink jet recording apparatus may have no mechanism to circulate the ink to the subtank 200. The pressure pump 202 may be provided at any place of the ink supply path.

The ink jet head 100 ejects the ink to a recording medium. In the example shown in FIG. 2, since a plurality of ink jet heads 100 is provided, by the use of those ink jet heads 100, recording having a long recording width can be performed at a time on the recording medium, and hence, for example, a line type ink jet recording apparatus is effectively used. However, the number of ink jet heads 100 may be one or more.

The ink jet recording apparatus described above by way of example can be preferably used to perform the recording method according to this embodiment.

2.2. Recording Medium

As a recording medium on which recording is performed by the recording method of this embodiment, a recording medium which may either include or not include a recording surface to absorb an ink may be mentioned. Hence, the recording medium is not particularly limited, and for example, a liquid absorbing recording medium, such as paper, a film, or a cloth, a liquid low-absorbing recording medium, such as printing paper, or a liquid non-absorbing recording medium, such as a metal, a glass, or a high molecular weight material, may be mentioned.

The liquid low-absorbing or the liquid non-absorbing recording medium indicates a recording medium which hardly absorbs an ink or which absorbs no ink at all, respectively. In a quantitative point of view, the liquid non-absorbing or the liquid low-absorbing recording medium indicates "a recording medium having a water absorption amount of 10 mL/m$^2$ or less from a contact start to 30 mseconds$^{1/2}$ measured by Bristow method". This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000. On the other hand, the liquid absorbing recording medium indicates a recording medium corresponding to neither the liquid non-absorbing recording medium nor the liquid low-absorbing recording medium. In addition, in this specification, the liquid low-absorbing recording medium and the liquid non-absorbing recording medium may be simply called a low-absorbing recording medium and a non-absorbing recording medium, respectively.

As the liquid non-absorbing recording medium, for example, a medium in which a plastic is coated on a substrate such as paper, a medium in which a plastic film is adhered to a substrate such as paper, or a plastic film having no absorbing layer (receiving layer) may be mentioned. As the plastic in this case, for example, there may be mentioned a poly(vinyl chloride), a poly(ethylene terephthalate), a polycarbonate, a polystyrene, a polyurethane, a polyethylene, or a polypropylene.

In addition, as the liquid low-absorbing recording medium, for example, a recording medium in which a liquid low-absorbing coating layer is provided on a substrate surface may be mentioned. For example, so-called coating paper may be mentioned. For example, as coating paper having a substrate made of paper, printing paper, such as art paper, coated paper, or mat paper, may be mentioned, and as coating paper having a substrate made of a plastic film, for example, there may be mentioned paper in which a plastic surface formed, for example, from a poly(vinyl chloride), a poly(ethylene terephthalate), a polycarbonate, a polystyrene, a polyurethane, a polyethylene, or a polypropylene is coated, for example, with a polymer or is coated with particles of silica, titanium, or the like together with a binder.

As the recording medium, a liquid absorbing recording medium may also be used. The liquid absorbing recording medium indicates a "recording medium having a water absorption amount of more than 10 mL/m$^2$ from a contact start to 30 mseconds$^{1/2}$ measured by Bristow method".

As the liquid absorbing recording medium, there may be mentioned a liquid absorbing recording medium formed by providing a receiving layer to absorb a liquid on a substrate surface. For example, ink jet paper (ink jet exclusive paper) may be mentioned. As the receiving layer to absorb a liquid, a layer formed, for example, from a liquid absorbing resin or liquid absorbing inorganic particles may be mentioned.

As the liquid absorbing recording medium, a recording medium in which its substrate itself has a liquid absorbing property may also be mentioned. For example, a cloth formed from fibers or paper containing pulp as a component may be mentioned. As the paper, for example, regular paper, cardboard, or linerboard may be mentioned. As the linerboard, a board formed from craft pulp or paper, such as waste paper, may be mentioned.

2.3. Other Steps

The recording method of this embodiment may also include, for example, a drying step (primary heating step) of drying the ink jet ink composition adhered to the recording medium and a step (post-heating step) of heating the recording medium.

2.4. Operational Effect

According to the recording method of this embodiment, in the state in which foreign substances are liable to be generated by the use of a recording apparatus having a portion in which members are pushed to each other by an external force, the generation of foreign substances is suppressed, and stable recording can be performed. In addition, according to this recording method, the abrasion resistance of an image to be formed can also be made preferable.

3. EXAMPLES AND COMPARATIVE EXAMPLES

Hereinafter, although the present disclosure will be described in detail with reference to Examples, the present disclosure is not limited thereto. Hereinafter, unless otherwise particularly noted, "part (s)" and "%" are each on a mass basis. In addition, unless otherwise particularly noted, the evaluation was performed in an environment at a temperature of 25.0° C. and a relative humidity of 40.0%.

3.1. Preparation of Ink Jet Ink Composition

After components were charged in a container to have one of the compositions shown in Tables 1 and 2 and were then mixed and stirred for 2 hours by a magnetic stirrer, filtration was performed using a membrane filter having a pore diameter of 5 μm, so that ink jet ink compositions (C01 to C19) used for Examples and Comparative Examples were obtained. In addition, the numerical values of the pigment and the resin particles in the tables each represent a solid content.

TABLE 1

| | | C01 | C02 | C03 | C04 | C05 | C06 | C07 |
|---|---|---|---|---|---|---|---|---|
| COLORANT | PB 15:3 | 4.0 | 4.0 | 4.0 | 4.0 | 4.0 | 4.0 | 4.0 |
| FIRST | JONCRYL 631 | 5.0 | — | — | 5.0 | 5.0 | 5.0 | 5.0 |
| RESIN | JONCRYL 1680 | — | 5.0 | — | — | — | — | — |
| PARTICLES | ELITEL KA-3556 | — | — | — | — | — | — | — |
| | SUPERFLE 170 | — | — | 5.0 | — | — | — | — |
| SECOND | HORDAMER PE02 | 1.0 | 1.0 | 1.0 | — | — | 1.0 | 1.0 |
| RESIN | HORDAMER PE03 | — | — | — | 1.0 | — | — | — |
| PARTICLES | HORDAMER PE34 | — | — | — | — | 1.0 | — | — |
| | AQUACER 515 | — | — | — | — | — | — | — |
| | AQUACER 630 | — | — | — | — | — | — | — |
| | HITEC E-6314 | — | — | — | — | — | — | — |
| | AQUACER 539 | — | — | — | — | — | — | — |
| WATER- | PROPYLENE GLYCOL | 15.0 | 15.0 | 15.0 | 15.0 | 15.0 | 15.0 | 8.0 |
| SOLUBLE | 1,2-BUTANEDIOL | — | — | — | — | — | — | — |
| ORGANIC | 1,3-BUTANEDIOL | — | — | — | — | — | — | — |
| SOLVENT | 1,3-PROPANEDIOL | — | — | — | — | — | — | 7.0 |

TABLE 1-continued

| | | | | | | | | |
|---|---|---|---|---|---|---|---|---|
| | 1,5-PENTANEDIOL | — | — | — | — | — | — | — |
| | TRIETHYLENE GLYCOL | — | — | — | — | — | 1.0 | — |
| | 1,2-HEXANEDIOL | 4.0 | 4.0 | 4.0 | 4.0 | 4.0 | 4.0 | 4.0 |
| pH ADJUSTER | TRIISOPROPANOLAMINE | 0.1 | 0.1 | 0.1 | 0.1 | 0.1 | 0.1 | 0.1 |
| SURFACTANT | SAG503A | 1.0 | 1.0 | 1.0 | 1.0 | 1.0 | 1.0 | 1.0 |
| WATER | ION EXCHANGE WATER | BALANCE | BALANCE | BALANCE | BALANCE | BALANCE | BALANCE | BALANCE |
| TOTAL | | 100 | 100 | 100 | 100 | 100 | 100 | 100 |
| HIGHEST BOILING POINT(° C.) | | 223 | 223 | 223 | 223 | 223 | 276 | 223 |
| FIRST RESIN PARTICLES/SECOND RESIN PARTICLES | | 5.0 | 5.0 | 5.0 | 5.0 | 5.0 | 5.0 | 5.0 |
| PG/ORGANIC SOLVENT(%) | | 79 | 79 | 79 | 79 | 79 | 75 | 42 |

| | | C08 | C09 | C10 | C11 | C12 | C13 |
|---|---|---|---|---|---|---|---|
| COLORANT | PB 15:3 | 4.0 | 4.0 | 4.0 | 4.0 | — | 4.0 |
| FIRST | JONCRYL 631 | 2.0 | 2.0 | 5.0 | 5.0 | 5.0 | — |
| RESIN | JONCRYL 1680 | — | 3.0 | — | — | — | — |
| PARTICLES | ELITEL KA-3556 | — | — | — | — | — | 5.0 |
| | SUPERFLE 170 | — | — | — | — | — | — |
| SECOND | HORDAMER PE02 | 2.0 | 1.0 | 1.0 | 3.0 | 1.0 | 1.0 |
| RESIN | HORDAMER PE03 | — | — | 1.0 | — | — | — |
| PARTICLES | HORDAMER PE34 | — | — | — | — | — | — |
| | AQUACER 515 | — | — | — | — | — | — |
| | AQUACER 630 | — | — | — | — | — | — |
| | HITEC E-6314 | — | — | — | — | — | — |
| | AQUACER 539 | — | — | — | — | — | — |
| WATER- | PROPYLENE GLYCOL | 15.0 | 15.0 | 15.0 | 15.0 | 15.0 | 15.0 |
| SOLUBLE | 1,2-BUTANEDIOL | — | — | — | — | — | — |
| ORGANIC | 1,3-BUTANEDIOL | — | — | — | — | — | — |
| SOLVENT | 1,3-PROPANEDIOL | — | — | — | — | — | — |
| | 1,5-PENTANEDIOL | — | — | — | — | — | — |
| | TRIETHYLENE GLYCOL | — | — | — | — | — | — |
| | 1,2-HEXANEDIOL | 4.0 | 4.0 | 4.0 | 4.0 | 4.0 | 4.0 |
| pH ADJUSTER | TRIISOPROPANOLAMINE | 0.1 | 0.1 | 0.1 | 0.1 | 0.1 | 0.1 |
| SURFACTANT | SAG503A | 1.0 | 1.0 | 1.0 | 1.0 | 1.0 | 1.0 |
| WATER | ION EXCHANGE WATER | BALANCE | BALANCE | BALANCE | BALANCE | BALANCE | BALANCE |
| TOTAL | | 100 | 100 | 100 | 100 | 100 | 100 |
| HIGHEST BOILING POINT(° C.) | | 223 | 223 | 223 | 223 | 223 | 223 |
| FIRST RESIN PARTICLES/SECOND RESIN PARTICLES | | 1.0 | 5.0 | 2.5 | 1.7 | 5.0 | 5.0 |
| PG/ORGANIC SOLVENT(%) | | 79 | 79 | 79 | 79 | 79 | 79 |

TABLE 2

| | | C14 | C15 | C16 | C17 | C18 | C19 |
|---|---|---|---|---|---|---|---|
| COLORANT | P.B 15:3 | 4.0 | 4.0 | 4.0 | 4.0 | 4.0 | 4.0 |
| FIRST | JONCRYL 631 | 5.0 | 5.0 | 5.0 | 5.0 | — | — |
| RESIN | JONCRYL 1680 | — | — | — | — | — | — |
| PARTICLES | ELITEL KA-3556 | — | — | — | — | — | — |
| | SUPERFLE 170 | — | — | — | — | — | — |
| SECOND | HORDAMER PE02 | — | — | — | — | 6.0 | — |
| RESIN | HORDAMER PE03 | — | — | — | — | — | — |
| PARTICLES | HORDAMER PE34 | — | — | — | — | — | — |
| | AQUACER 515 | 1.0 | — | — | — | — | 6.0 |
| | AQUACER 530 | — | 1.0 | — | — | — | — |
| | HITEC E-6314 | — | — | 1.0 | — | — | — |
| | AQUACER 539 | — | — | — | 1.0 | — | — |
| WATER- | PROPYLENE GLYCOL | 15.0 | 15.0 | 15.0 | 15.0 | 15.0 | 15.0 |
| SOLUBLE | 1,2-BUTANEDIOL | — | — | — | — | — | — |
| ORGANIC | 1,3-BUTANEDIOL | — | — | — | — | — | — |
| SOLVENT | 1,3-PROPANEDIOL | — | — | — | — | — | — |
| | 1,5-PENTANEDIOL | — | — | — | — | — | — |
| | TRIETHYLENE GLYCOL | — | — | — | — | — | — |
| | 1,2-HEXANEDIOL | 4.0 | 4.0 | 4.0 | 4.0 | 4.0 | 4.0 |
| pH ADJUSTER | TRIISOPROPANOLAMINE | 0.1 | 0.1 | 0.1 | 0.1 | 0.1 | 0.1 |
| SURFACTANT | SAG503A | 1.0 | 1.0 | 1.0 | 1.0 | 1.0 | 1.0 |
| WATER | ION EXCHANGE WATER | BALANCE | BALANCE | BALANCE | BALANCE | BALANCE | BALANCE |
| TOTAL | | 100 | 100 | 100 | 100 | 100 | 100 |

TABLE 2-continued

| | C14 | C15 | C16 | C17 | C18 | C19 |
|---|---|---|---|---|---|---|
| HIGHEST BOILING POINT(° C.) | 223 | 223 | 223 | 223 | 223 | 223 |
| FIRST RESIN PARTICLES/SECOND RESIN PARTICLES | 5.0 | 5.0 | 5.0 | 5.0 | 0.0 | 0.0 |
| PG/ORGANIC SOLVENT(%) | 79 | 79 | 79 | 79 | 79 | 79 |

The details of the components in Tables 1 and 2 are as shown below.

colorant: C.I. Pigment Blue 15:3 first resin particles acrylic-base: Joncryl 631 (glass transition point: 105° C.) Joncryl 1680 (glass transition point: 56° C.)

polyester-base: Elitel KA-3556 (glass transition point:) 80° C.

urethane-base: Superflex 170 (glass transition point: 75° C.)

second resin particles polyolefin-base:

HORDAMER PE02 (particle diameter: 116 nm, specific surface area: 0.04 $m^2/g$, solid content: 40%)

HORDAMER PE03 (particle diameter: 178 nm, specific surface area: 0.17 $m^2/g$, solid content: 40%)

HORDAMER PE34 (particle diameter: 117 nm, specific surface area: 0.12 $m^2/g$, solid content: 38%)

AQUACER515 (particle diameter: 45 nm, specific surface area: 3.1 $m^2/g$, solid content: 35%)

AQUACER530 (particle diameter: 84 nm, specific surface area: 4.3 $m^2/g$, solid content: 32%)

Hitec E-6324 (particle diameter: 74 nm, specific surface area: 4.7 $m^2/g$, solid content: 35%)

paraffin-base: AQUACER539 (particle diameter: 61 nm, specific surface area: 1.8 $m^2/g$, solid content: 35%)

water-soluble organic solvent alkanediol: propylene glycol (boiling point: 188° C.)

1,2-butanediol (boiling point: 193° C.)

1,3-butanediol (boiling point: 207° C.)

1,3-propanediol (boiling point: 214° C.)

1,5-pentanediol (boiling point: 239° C.)

Triethylene glycol (boiling point: 276° C.)

1,2-hexanediol (boiling point: 223° C.)

pH adjuster: amine, triisopropanolamine (boiling point: 299° C.)

surfactant: silicone-base, SAG503A (manufactured by Nisshin Chemical Industry Co., Ltd.)

water: ion exchange water

The specific surface area of the second resin particles thus used was obtained as described below from a relaxation time of a pulse NMR.

apparatus: pulse NMR (Acorn Drop, manufactured by Xigo Nanotools)

measurement temperature: 30° C.

measurement sample: 0.5 mL measurement sample A1: second resin particle dispersion measurement sample A2: water $S_p$: specific surface area of second resin particles in dispersion [$m^2/g$]

$$S_p=\{[R_{av}/R_b]-_1\}\times R_b/(0.0016\times\Psi_p) \quad \text{Equation (I)}$$

In Equation (I), $R_{av}$ represents the inverse number of a measurement value by the pulse NMR obtained using the measurement sample A1, $R_b$ represents the inverse number of a measurement value by the pulse NMR obtained using the measurement sample A2, and $\Psi_p$ is obtained by calculation using the following equation.

$$\Psi_p=(S_c/S_d)/[(1-S_c)/T_d] \quad \text{Equation (II)}$$

In Equation (II), $S_c$ represents a solid content concentration (percent by mass) of the measurement sample A1, $S_d$ represents the density of the second resin particles of the measurement sample A1, and $T_d$ represents the density of the measurement sample A2.

In addition, $S_d$ (density of the second resin particles) was regarded as 1.0, and $T_d$ (density of water) was also regarded as 1.0.

In addition, in FIGS. 1 and 2, the highest boiling point of the organic solvents contained in each composition, the mass ratio of the first resin particles to the second resin particles, and the rate of propylene glycol having a standard boiling point of 190° C. or less to the total mass of the organic solvents are shown.

3.2. Evaluation Method 3.2.1. Recording Test

Conditions: a modified SC-S80650 (manufactured by Seiko Epson Corporation) machine was prepared. As shown in FIG. 2, a pressure pump (liquid feed pump to be described later) was provided in an ink supply path.

A nozzle density of a nozzle line of a recording head was set to 360 dpi.

A heating mechanism for a recording medium was provided, and a surface temperature of the recording medium in recording was set to 40° C.

A temperature of the recording medium was set to 70° C. by a secondary heater located downstream in the transport direction of the recording medium, so that secondary heating was performed.

An adhesion amount of the ink jet ink composition of a recording pattern was set to 6 $mg/inch^2$.

A basic recording resolution was set to 720×720 dpi, a dot weight was set to 7 ng, and an ink dot density was adjusted, so that the adhesion amount described above was obtained.

As the recording medium, PET50A (manufactured by Lintec Corporation) having a width of 70 cm was used.

3.2.2. Evaluation of Abrasion Resistance

An ink solid portion of a recorded matter of each of the ink jet ink compositions of Examples, Comparative Examples, and Reference Examples was tested. As a rubbing finger, a non-ink printed region of a substrate was used, and a Gakushin test was performed (load: 500 g, 30 times). Evaluation was performed in accordance with the following criteria, and the results are shown in Table 3.

A: no color transfer to rubbing finger and no stain on printed surface are observed.

B: color transfer to rubbing finger is observed, but no stain on printed surface is observed.

C: stain on printed surface is observed but is inconspicuous.

D: stain on printed surface is conspicuous.

3.2.3. Evaluation of Foreign-Substance Resistance

As for the recorded matters of the ink jet ink compositions of Examples, Comparative Examples, and Reference Examples, a filter disposed in the ink supply path was observed in a manner as described below. The liquid feed pump (ink supply device) used in each example is shown in Table 3.

As P1, a liquid feed pump (Master Flex 07522 model, manufactured by Yamato Scientific Co., Ltd.) was used. P1 is a tube pump, and the frequency of pulsation is relatively low. P1 is an ink supply device having, at an inside of an ink supply path to supply an ink jet ink composition to an ink jet head, a portion in which members are pushed to each other by an external force. As P2, a liquid feed pump (manufactured by Yuken Kogyo Co., Ltd.) was used. P2 is a piston pump, and the frequency of pulsation is relatively high. Since P2 has in an ink supply path, no portion in which members are pushed to each other by an external force, foreign substances are not likely to be generated.

In each example, 500 g of the ink was circulated for one hour at a flow rate of 50 g/min. Next, after 10 ml of the ink was allowed to pass through the filter, the filter was then observed. Evaluation was performed in accordance with the following criteria, and the results are shown in Table 3.

A: no foreign substances are observed.

B: foreign substances are slightly observed.

C: foreign substances are observed.

D: many foreign substances are observed.

3.2.4. Evaluation of Ejection Stability (Reliability)

Recording was performed for 2 hours under the recording test conditions described above. In addition, after the recording was performed, simulated recording not to eject the ink from the head was performed. Subsequently, after the simulated recording was performed, suction cleaning was performed, and nozzles were then inspected. In one cleaning, 1 cc of the ink was discharged from the nozzle line. Evaluation was performed in accordance with the following criteria, and the results are shown in Table 3.

A: all nozzles are recovered by 1 cleaning.

B: all nozzles are recovered by 3 cleanings.

C: all nozzles are recovered by 6 cleanings.

D: not all nozzles are recovered by 6 cleanings.

TABLE 3

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|---|---|---|---|---|---|
| INK | C01 | C02 | C03 | C04 | C05 | C06 | C07 | C08 | C09 | C10 | C11 | C12 | C13 |
| INK SUPPLY DEVICE | P1 | P1 | P1 | P1 | P1 | P1 | P1 | P1 | P1 | P1 | P1 | P1 | P1 |
| FOREIGN-SUBSTANCE RESISTANCE | A | A | A | A | A | A | A | A | A | A | A | A | A |
| RELIABILITY | A | A | B | A | A | A | A | B | A | A | B | A | B |
| ABRASION RESISTANCE | B | A | B | A | B | C | C | C | B | A | A | B | B |

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | REFERENCE EXAMPLE 1 |
|---|---|---|---|---|---|---|---|
| INK | C14 | C15 | C16 | C17 | C18 | C19 | C03 |
| INK SUPPLY DEVICE | P1 | P1 | P1 | P1 | P1 | P1 | P2 |
| FOREIGN-SUBSTANCE RESISTANCE | D | D | D | C | A | D | A |
| RELIABILITY | C | C | C | B | B | B | A |
| ABRASION RESISTANCE | A | A | A | D | D | D | B |

| | REFERENCE EXAMPLE 2 | REFERENCE EXAMPLE 3 | REFERENCE EXAMPLE 4 | REFERENCE EXAMPLE 5 | REFERENCE EXAMPLE 6 | REFERENCE EXAMPLE 7 | REFERENCE EXAMPLE 8 |
|---|---|---|---|---|---|---|---|
| INK | C04 | C05 | C14 | C15 | C16 | C18 | C19 |
| INK SUPPLY DEVICE | P2 | P2 | P2 | P2 | P2 | P2 | P2 |
| FOREIGN-SUBSTANCE RESISTANCE | A | A | B | B | B | A | B |
| RELIABILITY | A | A | B | B | B | A | A |
| ABRASION RESISTANCE | A | B | A | A | A | D | D |

3.3. Evaluation Results

From Table 3, it was found that since the ink jet ink composition of each Example is an aqueous ink composition containing first resin particles formed from a resin other than a polyolefin-based resin and second resin particles formed from a polyolefin-based resin, and as the second resin particles, resin particles having a specific surface area of 0.18 $m^2/g$ or less obtained from a relaxation time of a pulse NMR are contained, the foreign-substance resistance and the abrasion resistance of the recorded matter are excellent. In addition, although description was omitted, when a diaphragm pump (manufactured by Tacmina Corporation) was used instead of using the tube pump represented by P1, results similar to those obtained by the tube pump were obtained.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples described above, the following conclusions can be obtained.

An ink jet ink composition is an aqueous ink composition containing first resin particles formed from a resin other than a polyolefin-based resin and second resin particles formed from a polyolefin-based resin, the ink jet ink composition described above is used by a recording apparatus which has, at an inside of an ink supply path to supply an ink jet ink composition to an ink jet head, a portion in which members are pushed to each other by an external force, and as the second resin particles, resin particles having a specific surface area of 0.18 $m^2/g$ or less obtained from a relaxation time of a pulse NMR are contained.

According to this ink jet ink composition, even when the recording apparatus having a portion in which members are pushed to each other by an external force is used, the generation of foreign substances is suppressed, and stable recording can be performed. In addition, according to the ink jet ink composition described above, the abrasion resistance of an image to be formed can also be made preferable.

In the ink jet ink composition described above, the specific surface area of the second resin particles may be 0.05 to 0.18 $m^2/g$.

According to this ink jet ink composition, the abrasion resistance of the image can be further improved.

In the ink jet ink composition described above, a content of the second resin particles with respect to a total mass of the ink jet ink composition may be 0.1 to 5.0 percent by mass.

According to this ink jet ink composition, the abrasion resistance of the image can be further improved.

In the ink jet ink composition described above, the first resin particles may be formed from an acrylic-based resin, an urethane-based resin, or a polyester-based resin.

According to this ink jet ink composition, the abrasion resistance of the image can be further improved.

In the ink jet ink composition described above, a mass ratio of a content of the first resin particles to a content of the second resin particles may be 1 to 5.

According to this ink jet ink composition, the abrasion resistance of the image can be further improved. In the ink jet ink composition described above, the recording apparatus may include a diaphragm pump or a tube pump having a portion in which members are pushed to each other by an external force.

According to this ink jet ink composition, even in the state in which foreign substances are more liable to be generated, stable recording can be performed.

In the ink jet ink composition described above, the recording apparatus may be a line printer or a head scan type printer having an ink jet head scan width of 50 cm or more with respect to a recording medium.

According to this ink jet ink composition, even in the state in which foreign substances are more liable to be generated, stable recording can be performed.

The ink jet ink composition described above may further contain at least one organic solvent, and a rate of an organic solvent having a standard boiling point of 190° C. or less with respect to a total mass of the at least one organic solvent may be 50 percent by mass or more.

According to this ink jet ink composition, even when the ink in the vicinity of a nozzle is liable to be dried, and the ejection reliability is also liable to be decreased, stable recording can be performed, and the abrasion resistance of an image to be formed can be made more excellent.

The ink jet ink composition described above may further contain at least one organic solvent, and the highest standard boiling point of the at least one organic solvent may be 250° C. or less.

According to this ink jet ink composition, even when the ink in the vicinity of a nozzle is liable to be dried, and the ejection reliability is also liable to be decreased, stable recording can be performed, and the abrasion resistance of an image to be formed can be made more excellent.

In the ink jet ink composition described above, the second resin particles may have a volume average particle diameter of 50 to 300 nm.

According to this ink jet ink composition, even in the state in which foreign substances are more liable to be generated, stable recording can be performed.

In the ink jet ink composition described above, the recording apparatus may have an ink circulation mechanism in the ink supply path.

According to this ink jet ink composition, even in the state in which foreign substances are more liable to be generated, stable recording can be performed.

A recording method is performed using a recording apparatus which has, at an inside of an ink supply path to supply an ink jet ink composition to an ink jet head, a portion in which members are pushed to each other by an external force, and the recording method comprises: a supply step of supplying the ink jet ink composition described above to the ink jet head through the ink supply path; and an ejection step of ejecting the ink jet ink composition from the ink jet head.

According to this recording method, in the state in which foreign substances are liable to be generated by the recording apparatus having a portion in which members are pushed to each other by an external force, the generation of foreign substances can be suppressed, and stable recording can be performed. In addition, according to this recording method, the abrasion resistance of an image to be formed can also be made preferable.

What is claimed is:

1. A recording method performed using a recording apparatus which has, at an inside of an ink supply path to supply an ink jet ink composition to an ink jet head, a diaphragm pump or a tube pump having a portion in which members are pushed to each other by an external force, the recording method comprising:

a supply step of supplying an ink jet ink composition to the ink jet head through the ink supply path; and an ejection step of ejecting the ink jet ink composition from the ink jet head, wherein the ink jet composition contains:

first resin particles formed from a resin other than a polyolefin-based resin; and second resin particles formed from a polyolefin-based resin, wherein, as the second resin particles, resin particles having a specific surface area of 0.18 $m^2/g$ or less obtained from a relaxation time of a pulse NMR are contained.

2. The recording method according to claim 1, wherein the specific surface area of the second resin particles is 0.05 to 0.18 $m^2/g$.

3. The recording method according to claim 1, wherein a content of the second resin particles with respect to a total mass of the ink jet ink composition is 0.1 to 5.0 percent by mass.

4. The recording method according to claim 1, wherein the first resin particles are formed from an acrylic-based resin, an urethane-based resin, or a polyester-based resin.

5. The recording method according to claim 1, wherein a mass ratio of a content of the first resin particles to a content of the second resin particles is 1 to 5.

6. The recording method according to claim 1, wherein the recording apparatus is a line printer or a head scan type printer having an ink jet head scan width of 50 cm or more with respect to a recording medium.

7. The recording method according to claim 1, further containing at least one organic solvent, wherein a rate of an organic solvent having a standard boiling point of 190° C. or less with respect to a total mass of the at least one organic solvent is 50 percent by mass or more.

8. The recording method according to claim 1, further containing at least one organic solvent, wherein the highest standard boiling point of the at least one organic solvent is 250° C. or less.

9. The recording method according to claim 1, wherein the second resin particles have a volume average particle diameter of 50 to 300 nm.

10. The recording method according to claim 1, wherein the recording apparatus has an ink circulation mechanism in the ink supply path.

* * * * *